US011266920B2

(12) United States Patent
Jensen et al.

(10) Patent No.: US 11,266,920 B2
(45) Date of Patent: Mar. 8, 2022

(54) TOY GEARBOX

(71) Applicant: LEGO A/S, Billund (DK)

(72) Inventors: Jeppe Juul Jensen, Billund (DK);
Marc Clapés Mayol, Billund (DK);
Michael T. Jeppesen, Billund (DK);
Markus Kossmann, Billund (DK)

(73) Assignee: LEGO A/S, Billund (DK)

( * ) Notice: Subject to any disclaimer, the term of this patent is extended or adjusted under 35 U.S.C. 154(b) by 114 days.

(21) Appl. No.: 16/958,992

(22) PCT Filed: Jan. 10, 2019

(86) PCT No.: PCT/EP2019/050531
§ 371 (c)(1),
(2) Date: Jun. 29, 2020

(87) PCT Pub. No.: WO2019/137993
PCT Pub. Date: Jul. 18, 2019

(65) Prior Publication Data
US 2020/0330893 A1 Oct. 22, 2020

(30) Foreign Application Priority Data
Jan. 11, 2018 (DK) .......................... PA 2018 70019

(51) Int. Cl.
A63H 31/00 (2006.01)
A63H 31/08 (2006.01)
(Continued)

(52) U.S. Cl.
CPC ........... *A63H 33/042* (2013.01); *A63H 31/00* (2013.01); *A63H 31/08* (2013.01); *A63H 33/086* (2013.01); *F16D 11/14* (2013.01)

(58) Field of Classification Search
CPC ........ A63H 17/00; A63H 31/00; A63H 31/08; F16D 11/10; F16D 11/14
See application file for complete search history.

(56) References Cited

U.S. PATENT DOCUMENTS 2,625,831 A * 1/1953 Saunders, Jr. ......... A63H 29/20
74/342
3,475,854 A * 11/1969 Ryan ...................... A63H 17/00
446/424
(Continued)

FOREIGN PATENT DOCUMENTS

EP 1225375 A2 7/2002
EP 1286081 A1 2/2003
(Continued)

OTHER PUBLICATIONS

First Technical Examination and Search Report issued in Danish priority application No. PA 2018 70019, dated Jul. 11, 2018. (7 pages).
(Continued)

Primary Examiner — John A Ricci
(74) Attorney, Agent, or Firm — Day Pitney LLP; Valeriya Svystun

(57) ABSTRACT

A toy gearbox comprising at least one gear shaft (1, 2) rotatably supported by a gear support construction and having at least one spline, and at least one gear wheel (21, 22, 23, 24) rotatably arranged on the gear shaft (1, 2), a first clutch member (50) being attached to the gear wheel (21, 22, 23, 24) and rotatably arranged on the gear shaft (1, 2) and a second clutch member comprising a driving ring (41, 42) being fixed against rotation about and slidably arranged on the gear shaft (1, 2) and comprising a guide member (45) and at least one claw clutch (46, 47) for selectively engaging or disengaging with the first clutch member (50) and thereby engaging or disengaging the gear wheel (21, 22, 23, 24) from rotating along with the gear shaft and where an axial cam (10) arranged on a gear shifter axle (11) being mounted in the gear support construction and having an axis of symmetry extending parallel with the gear shaft (1, 2), so (Continued)

Figure 1:
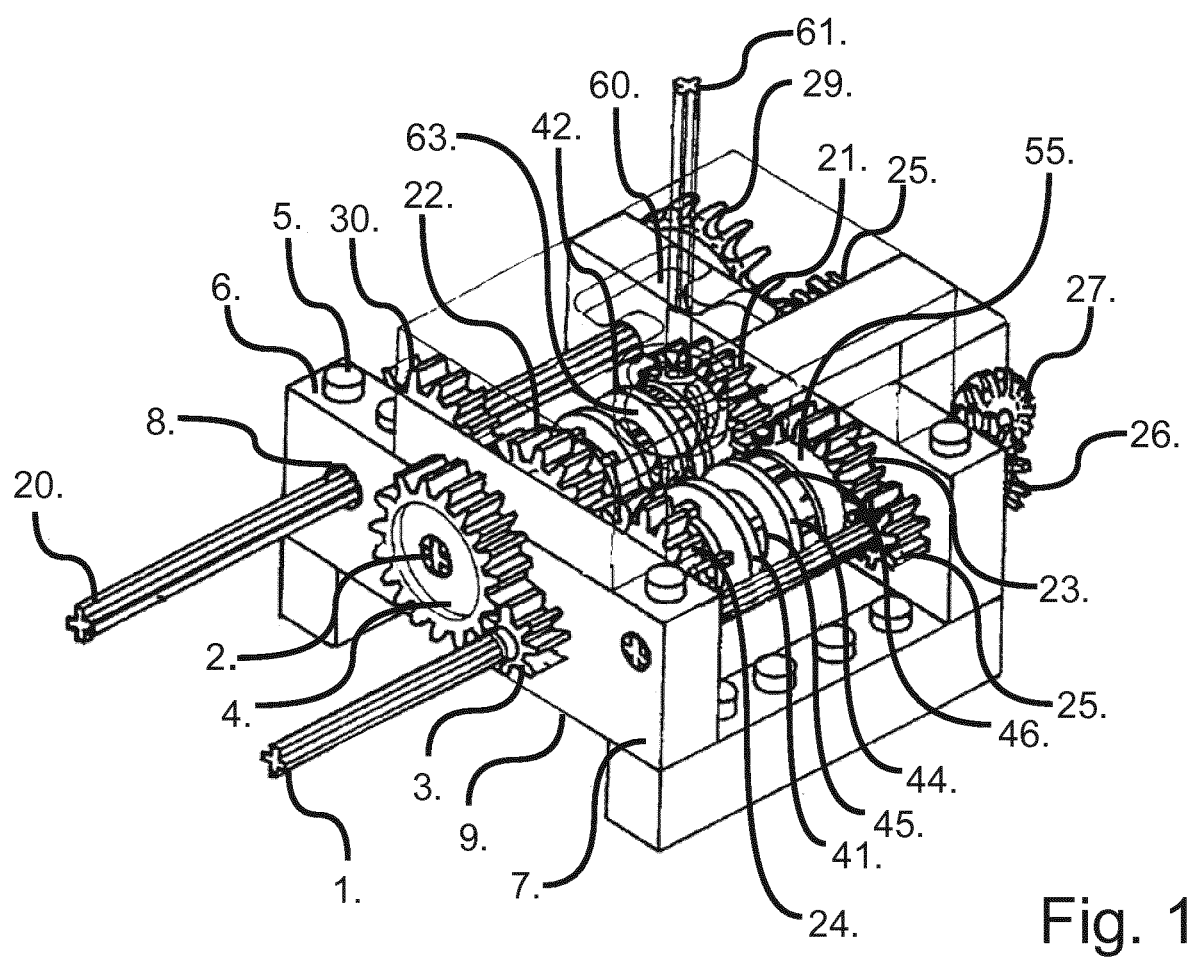

that the guide member (45) on the axially slidable driving ring (41, 42) engages with the axial cam (10).

11 Claims, 3 Drawing Sheets

(51) Int. Cl.
*F16D 11/14* (2006.01)
*A63H 33/04* (2006.01)
*A63H 33/08* (2006.01)

(56) References Cited

U.S. PATENT DOCUMENTS

| | | | |
|---|---|---|---|
| 4,135,328 A * | 1/1979 | Yamasaki | A63H 29/20 446/463 |
| 4,141,256 A | 2/1979 | Wilson et al. | |
| 4,485,587 A | 12/1984 | Barlow et al. | |
| 5,687,610 A | 11/1997 | Poulsen et al. | |
| 6,370,976 B1 | 4/2002 | Döeppling et al. | |
| 6,694,835 B2 * | 2/2004 | Kawahara | A63H 31/00 180/364 |
| 7,234,990 B2 * | 6/2007 | Leonov | A63H 17/22 446/440 |
| 7,749,046 B2 * | 7/2010 | Miva | A63H 31/08 446/462 |
| 2005/0022573 A1 | 2/2005 | Zeibig et al. | |

FOREIGN PATENT DOCUMENTS

| | | |
|---|---|---|
| EP | 1286081 B1 | 11/2004 |
| WO | 2016/208700 A1 | 12/2016 |

OTHER PUBLICATIONS

International Search Report issued in corresponding international application No. PCT/EP2019/050531, dated Apr. 10, 2019. (3 pages).

Written Opinion of the International Searching Authority issued in corresponding international application No. PCT/EP2019/050531, dated Apr. 10, 2019. (5 pages).

\* cited by examiner

TOY GEARBOX

CROSS-REFERENCE TO RELATED APPLICATIONS

This application is a U.S. National Stage of International Application No. PCT/EP2019/050531, filed on 10 Jan. 2019 and published on 18 Jul. 2019, as WO 2019/137993 A1, which claims the benefit of priority to Danish Patent Application No. PA 2018 70019, filed on 11 Jan. 2018. The content of each of the above referenced patent applications is incorporated herein by reference in its entirety for any purpose whatsoever.

THE PRIOR ART

The present invention relates to toy gearboxes comprising a gear support construction having gear shaft rotatably supported by the gear support construction and having at least one spline and a gear wheel rotatably arranged on the gear shaft, and where the gear wheel is connected to a first clutch member rotatably arranged on the gear shaft, and a second clutch member comprising a driving ring being fixed against rotation about and slidably arranged on the gear shaft and comprising a guide member and at least one claw clutch for selectively engaging or disengaging with the first clutch member and thereby engaging or disengaging the gear wheel from rotating along with the gear shaft, and where a gear shifter is used engaging with the guide member of the axially slidable driving ring and being configured for axially sliding the second clutch member on the gear shaft.

Especially in use with toy construction sets the use of gear elements are used for the purpose of enabling the user to construct different designs of gearboxes and to employ such gear boxes in different construction, such as vehicles of different types.

U.S. Pat. No. 5,687,610 discloses such a gear box having a gearshifter mechanism arranged for the purpose of giving the user the option of building a stickshift transmission for eg. a toy vehicle.

THE OBJECT OF THE INVENTION

On this background it is the purpose of the present invention to provide a gearbox allowing the user to employ the gearbox in more different constructions than constructions requiring a stickshift based gearbox.

This is obtained by the invention defined in the introduction and in that the gear shifter mechanism comprises an axial cam arranged on a gear shifter axle being mounted in the gear support construction and having an axis of symmetry extending parallel with the gear shaft, and so that the guide member on the axially slidable driving ring engages with the axial cam.

Thereby the shifting of gears or simply the engagement and disengagement of a gear wheel from rotation about a gear shaft is obtained just by rotating the axial cam instead of requiring a complex stickshift mechanism according to prior art.

In a preferred embodiment the guide member comprises an annular guide groove, and the axial cam comprises at least one cam flange extending partially axially along and protruding radially from the axial cam.

In this relation the cam flange may advantageously extend continuously around the axial cam.

Furthermore the cam flange may preferably comprise a first section arranged at a first axial position and a first radial position on the axial cam, a second section arranged at a second axial position and a second radial position different from the first axial and the first radial position respectively, and where the cam flange further comprises intermediate sections formed by flanges extending between the first and the second axial and radial positions.

In this relation the width in the axial direction of the first and the second section of the cam flange may correspond to the width of the annular guide groove on the guide member, and the corresponding width of the intermediate sections of the cam flange may be significantly smaller.

The gear shifter axle may also have one or more splines extending in the axial direction of the axle, and where the axial cam is a separate unit fixedly mounted on the gear shifter axle.

The invention is especially useful in relation to toy building sets where the gear support construction comprises an assembly of building blocks being interconnected via couplings knobs arranged on a upper surface and complementarily shaped coupling sockets arranged on a bottom surface of each building block, and where at least some of the building elements has through holes on side surfaces extending between the upper and lower surfaces of each building block, the through holes being adapted for insertion of the at least one gear shaft and the gear shifter axle.

In a further preferred embodiment the gearbox comprises two or more gear shafts arranged in parallel with each other and with the gear shifter axle, each of the two or more gear shafts having one or more gear wheels mounted on it.

Preferably the two or more gear shafts each has a driving ring slidably mounted on gear shaft, and where each of the two or more gear shafts are mounted equidistantly with respect to the gear shifter axle, and so that the axial cam engages with the guide member of each driving ring.

The invention also provides a computer-readable model comprising computer-readable instructions configured to cause, when processed by an apparatus for performing an additive manufacturing process, said apparatus to manufacture the toy building elements as defined above.

THE DRAWING

In the following one or more embodiments of the invention will be described in more detail and with reference to the drawing, where:

FIG. 1: Is a principle drawing, showing a gear box according to prior art.

Figure 2:
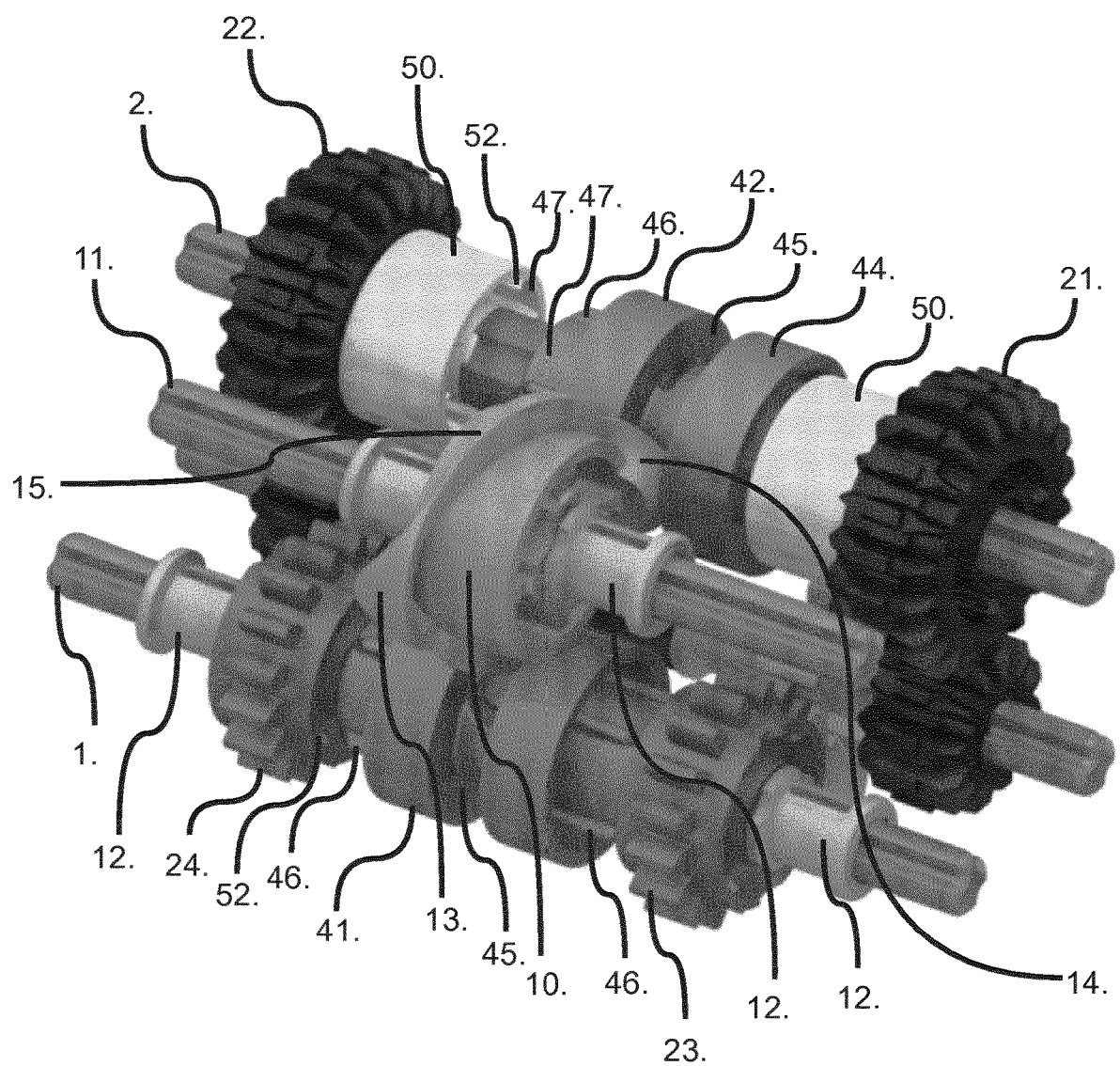

FIG. 2: Is principle drawing of a gear box corresponding to the gear box shown in FIG. 1, but with a gear shifter mechanism according to one embodiments of the present invention.

Figure 3:
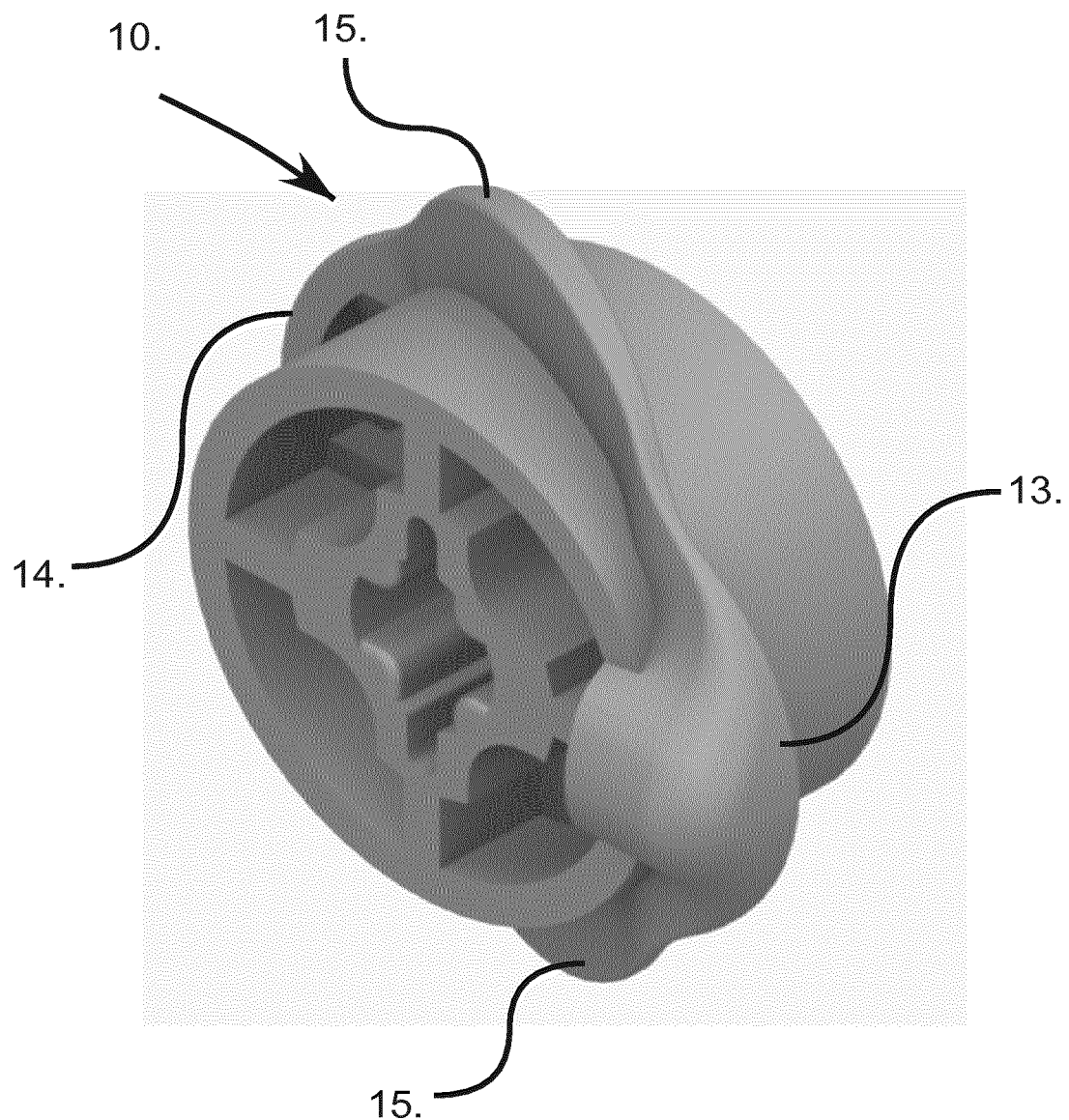

FIG. 3: Is a drawing showing an embodiment of the axial cam as shown in FIG. 2.

DESCRIPTION OF EXEMPLARY EMBODIMENTS

FIG. 1 shows a prior art toy gear box as disclosed in U.S. Pat. No. 5,687,610 the content of which is hereby incorporated by reference. This prior art gear box have an input shaft or primary driven shaft 1 with a gear wheel 3 which is fixedly mounted on the shaft. The gear wheel 3 drives a gear wheel 4 which is fixedly mounted on another shaft 2 which is parallel with the primary driven shaft 1.

The gear wheels 3 and 4 are in permanent engagement, and the two shafts 1 and 2 are thus rotationally ties to each other, and owing to the different sizes of the gear wheels 3 and 4 the shafts 1 and 2 have different speeds of rotation. In this connection, these shafts 1 and 2 have the same function of driven shafts, and below the expression primary driven shaft is used for the shaft 1 and the expression secondary driven shaft for the shaft 2.

The gearbox has an output shaft or driving shaft 20 with two fixed gear wheels 29, 30. The gear wheel 29 on the driving shaft 20 is in permanent rotational connection with gear wheels 27, 26, 25, 23 and 21, and the gear wheel 30 on the driving shaft 20 is in permanent rotational connection with gear wheels 22 and 24. The gear wheels 21 and 22 are mounted rotatably on the secondary driven shaft 2 in fixed axial positions, and the gear wheels 23 and 24 are likewise mounted rotatably on the primary driven shaft 1 in fixed axial positions.

The primary driven shaft 1 carries a first driving ring 41, which is rotationally tied to the shaft 1, and which can be slid axially on the shaft 1. The secondary driven shaft 2 likewise carries a second driving ring 42, which is identical with the first driving ring 41 and is rotationally tied to the shaft 2 and is axially slidable on the shaft 2.

In the following the reference numbers for the claws 46 and angular gaps 47 are shown only on FIG. 2 referring to the same type of elements.

A driving ring 41 consists of a pipe member having two radially protruding flanges 44 on the outer side. The two flanges 44 define an annular guide groove 45 whose bottom is formed by a portion of the pipe member. Claws 46 protrude in an axial direction from each of the flanges 44. The claws 46 has their tips facing away from the flanges 44 concerned. The claws 46 are moreover in firm connection with the pipe member. The claws 46 are narrow, and each set of claws defines angular gaps 47 between claws 46 which are considerably larger than the angular extent of the individual claw 46. Further, the driving ring 41 has projections (not shown) on the inner side of the pipe member to engage a corresponding, axially extending depression (not shown) in each of the driven shafts 1 and 2, so that, as mentioned, the driving rings 41 and 42 are in rotationally firm connection with the respective driven shafts 1 and 2 and are axially slidable on these. On the driving ring 41, each of the flanges 44 having axially protruding claws 46 constitutes one clutch half of a claw clutch, as will be explained below.

The other clutch half 50 consists of an outer pipe or ring member 51 having claws 52 on the inner side, each of which has substantially the same shape as the claws 46. The clutch half 50 moreover has an inner pipe or ring member which is located coaxially with the outer pipe member 51, and by means of which the coupling half 50 may be mounted freely rotatably on a shaft. The pipe members 51 and 53 are contiguous via a common flange (not shown). Each of the claws 52 and the inner tube member define between them a radial gap capable of receiving the end of the pipe member on the driving ring 41 so that the claws 52 may be received in the angular gaps 47 between the claws 46. Correspondingly, angular gaps 54 are present between the claws 52 in which the claws 46 may be received. The outer cylindrical surface 55 of the outer pipe member 51 may be provided with radially protruding teeth, so that the clutch half 50 serves as a gear wheel which may be mounted freely rotatably on a shaft.

The driving ring 41 and the clutch half 50 may be mounted on a common shaft on which the driving ring 41 is axially slidable, and the end of the pipe member with the claws 46 may be received in the gap between the outer pipe member 51 and the inner pipe member, thereby providing a claw clutch. Since both the claws 46 and the claws 52 in the coupling region are narrow and have large gaps, it will always be possible in practice to make such a coupling irrespective of the mutual angular position of the driving ring 41 and the clutch half 50.

Each of the gear wheels 21, 22, 23 and 24 are constructed like the clutch half 50 with radially protruding teeth and axially protruding claws 52. The driving rings 41 and 42 are axially slidable on the primary driven shaft 1 and the secondary driven shaft 2, respectively, so that, as described above, the claws 46 may be inserted into the angular gaps 54 between the claws 52. Thus, the gearbox has four claw clutches, which may be engaged individually. The first gear of the toy gearbox is selected with the claw clutch, and the transmission of rotational energy from the primary driven shaft 1 then takes place via the gear wheels 3 and 4 to the secondary driven shaft 2, which drives the second driving ring 42, from which the rotational energy is transmitted through the claw clutch to the gear wheels 21, 23, 25, 26, 27, 28 and 29 to the driving shaft 20.

Similarly, it will be seen that the claw clutches correspond to the first, the second, the third and the fourth gears of the toy gearbox, respectively.

The toy gearbox is shown in FIG. 1 in a position in which the four claw clutch gears are all disengaged, so that no rotational movement can be transmitted from any of the driven shafts 1, 2 to the driving shaft 20, or vice versa. This means that the toy gearbox is in neutral. The two driving rings 41 and 42 here have their guide grooves 45 arranged opposite each other, and FIG. 1 shows that this prior art gearbox has a "stickshift" gear lever 61 which is mounted in a ball bearing 63 centrally with respect to the shown position of the guide grooves 45 and out of the plane defined by the driven shafts 1 and 2. The gear lever can thus be tilted in the ball bearing and has its movement restricted by an H-shaped guide 60. The gear lever is movable transversely in the central part of the H-shaped guide, and an engagement end of the gear lever 61 may thus be engaged with a selected one of the guide grooves 45. Upon further tilting of the gear lever in a direction longitudinally of the driven shafts 1 and 2, the gear lever moves the driving ring concerned axially because of its engagement with the guide groove 45 concerned until the claw clutched concerned is engaged. The H-shaped guide 60 ensures that no more than one of the claw clutches is engaged at a time, since movement of the engagement end of the gear lever from the guide groove of one driving ring to the guide groove of the other driving ring can only take place through the central portion of the H-shaped guide 60, where both driving rings are in the shown neutral position.

With this structure, the gear lever directly engages the guide grooves of the driving rings, i.e. without intermediate mechanisms.

The shown toy gearbox is reciprocal so that the driving shaft 20 may be used as the driven shaft, and when the pair of gear wheels 3, 4 is omitted, the shown gearbox enables it to be chosen whether rotational energy is to be transmitted from the shaft 20 to the shaft 1 or to the shaft 2. The toy gearbox may hereby be used for driving mechanisms each of which is coupled to a respective one of the shafts 1 and 2, and these may then be driven one at a time or simultaneously.

According to the present invention an alternative shifting mechanism for e.g. the above mentioned prior art "stickshift" gearbox is provided, and the principle of this alternative shifting mechanism is shown in FIG. 2 showing the gear shafts 1 and 2, and the gear wheels 22, 23, 24 and 25 as well as the driving rings 41 and 42 all having in principle the same function as the corresponding elements on FIG. 1.

For the sake of clarity all shafts and axles on FIG. 2 are rotatably mounted in a gear support construction (not shown) being assembled from a number of building elements such as shown in FIG. 1.

In this embodiment the shifting mechanism comprises an axial cam 10 fixedly mounted on a gear shifter axle 11 in the form of a cross axle with 4 splines. As shown in FIG. 3 the axial cam 10 has a set of ribs arranged inside the through hole engaging with the splines on the gear shifter axle 11, so that it is rotationally tied to the gear shifter axle. Furthermore a set of friction sleeves 12 are arranged on each side of the axial cam 10, so that the axial cam is fixed against sliding along the gear shifter axle 11.

In this embodiment the axial cam, which is also shown in detail on FIG. 3 comprises a cam flange having a first cam flange section 13 and a second cam flange section 14 being axially displaced with respect to each other and arranged radially on opposite sides of the axial cam 10 with respect to each other, and between the first and the second cam flange sections 13, 14 intermediate cam flange sections 15 extend to form a continuous cam flange that engages with the grooves 45 on each of the driving rings 41, 42 so that when the axial cam is rotated about the longitudinal axis of the gear shifter axle 11, then the claws 46 are brought into engagement with claws 52 on a clutch half being connected to one of the gear wheels 21, 22, 23 or 24 and in the angular position of the axial cam as shown on FIG. 2 the driving ring is engaged with the clutch half 50. Connected to the gear wheel 21 and the driving ring 41, is disconnected from both the gear wheels 23 and 24.

According to this embodiment the first and the second sections 13, 14 of the cam flange has almost the same width as the grove 45. On each of the driving rings 41 and 42, so that the driving rings 41 and 42 are positioned very exactly when they are engaging with the clutch halves connected to any of the gear wheels 21, 22, 23 or 24 and the intermediate sections of the flange sections 15 are very narrow in order to allow continuous engagement with the groves 45 on the driving rings also when the driving rings are disconnected from any clutch halves 50.

It will be apparent to the skilled person that the present invention may be used in relation to gear constructions for different purposes and that it might be used for only engaging and disengaging a single gear wheel from rotation about an axle, or be used for more complex gear constructions with more gear shafts and functions than the one disclosed above. As an example the gearbox may be expanded to three or optionally more parallel driven shafts equidistantly spaced from the cam, thereby increasing the number of selectable gear wheel transmissions.

In this relation it will also be apparent to the skilled person that the design of the axial cam 10 may be altered with respect to having more cam flanges or having a different flange design for a specific purpose.

Furthermore the skilled person would as a matter of routine suggest producing plastic toy building elements of any of the above mentioned types by injection molding in a conventional injection molding apparatus.

As an aspect of the present invention, however, it would be an advantage to produce e.g. the axial cam by 3D printing or another additive manufacturing process due to the fact that it would thereby be easy to customize the shape and size of the axial cam flange for a specific purpose in a toy construction set. The present disclosure further relates to a computer-readable model comprising computer-readable instructions configured to cause, when processed by an apparatus for performing an additive manufacturing process, said apparatus to manufacture a toy building element as disclosed herein. The computer-readable model may comprise geometry information indicative of at least the shape of the toy construction element. The computer-readable model may be embodied as a computer-readable medium having stored thereon a data structure representing the computer-readable model. For example, the computer-readable medium may include a hard disk, a memory, or another suitable storage device. The additive manufacturing process may include a 3D printing process.

The invention claimed is:

1. A toy gearbox comprising:
a gear support construction;
at least one gear shaft rotatably supported by the gear support construction and having at least one spline;
at least one gear wheel rotatably arranged on the gear shaft;
a first clutch member being attached to the gear wheel and rotatably arranged on the gear shaft;
a second clutch member comprising a driving ring being fixed against rotation about and slidably arranged on the gear shaft and comprising a guide member and at least one claw clutch for selectively engaging or disengaging with the first clutch member and thereby engaging or disengaging the gear wheel from rotating along with the gear shaft; and
a gear shifter engaging with the guide member of the axially slidable driving ring and being configured for axially sliding the second clutch member on the gear shaft, wherein the gear shifter comprises an axial cam arranged on a gear shifter axle being mounted in the gear support construction and having an axis of symmetry extending parallel with the gear shaft, and so that the guide member on the axially slidable driving ring engages with the axial cam.

2. A toy gearbox according to claim 1, wherein the guide member comprises an annular guide groove, and the axial cam comprises at least one cam flange extending partially axially along and protruding radially from the axial cam.

3. A toy gearbox according to claim 2, wherein the cam flange extends continuously around the axial cam.

4. A toy gearbox according to claim 2, wherein the cam flange comprises a first section arranged at a first axial position and a first radial position on the axial cam, a second section arranged at a second axial position and a second radial position different from the first axial and the first radial position respectively, and where the cam flange further comprises intermediate sections formed by flanges extending between the first and the second axial and radial positions.

5. A toy gearbox according to claim 4, wherein a width in an axial direction of the first and the second section of the cam flange corresponds to a width of the annular guide groove on the guide member, and the corresponding width of the intermediate sections of the cam flange is significantly smaller.

6. A toy gearbox according to claim 1, where the gear shifter axle has one or more splines extending in the axial direction of the axle, and where the axial cam is a separate unit fixedly mounted on the gear shifter axle.

7. A toy gearbox according to claim 1, wherein the gear support construction comprises an assembly of building blocks being interconnected via through holes on side surfaces extending between the upper and lower surfaces of each building block, the through holes being adapted for insertion of the at least one gear shaft and the gear shifter axle.

8. A toy gearbox according to claim 1, wherein one or more of the building blocks are interconnected via couplings knobs arranged on an upper surface and complementarily shaped coupling sockets arranged on a bottom surface of each building block.

9. A toy gearbox according to claim 1, wherein the gearbox comprises two or more gear shafts arranged in parallel with each other and with the gear shifter axle, each of the two or more gear shafts having one or more gear wheels mounted on it.

10. A toy gearbox according to claim 9, wherein the two or more gear shafts each has a driving ring slidably mounted on gear shaft, and where each of the two or more gear shafts are mounted equidistantly with respect to the gear shifter axle, and so that the axial cam engages with the guide member of each driving ring.

11. A computer-readable model comprising computer-readable instructions configured to cause, when processed by an apparatus for performing an additive manufacturing process, said apparatus to manufacture toy building elements of the toy gearbox as defined in claim 1.

* * * * *